United States Patent [19]

Lloyd

[11] Patent Number: 4,877,489

[45] Date of Patent: Oct. 31, 1989

[54] ELECTRONIC CONTROL AND DOSING SYSTEM FOR DESALINATORS

[75] Inventor: Ian Lloyd, Queensland, Australia

[73] Assignee: Nautical Services Pty. Ltd., Queensland, Australia

[21] Appl. No.: 105,387

[22] PCT Filed: Nov. 21, 1986

[86] PCT No.: PCT/AU86/00352

§ 371 Date: Jul. 21, 1987

§ 102(e) Date: Jul. 21, 1987

[87] PCT Pub. No.: WO87/03275

PCT Pub. Date: Jun. 4, 1987

[30] Foreign Application Priority Data

Nov. 21, 1985 [AU] Australia .............................. Ph 3506
Nov. 27, 1985 [AU] Australia .............................. Ph 3611

[51] Int. Cl.⁴ .......................... B01D 3/42; G01F 23/00
[52] U.S. Cl. ..................................... 202/181; 202/197; 202/264; 203/1; 203/10; 203/12; 203/20; 203/40; 203/DIG. 17; 203/DIG. 18; 73/304 R; 340/620; 137/5; 137/386; 137/392; 55/257.6
[58] Field of Search ............... 202/181, 193, 196, 197, 202/189, 264, 267.1; 203/1, 10, 12, 86.20, 40, DIG. 17, DIG. 18; 73/304 C, 304 R; 340/620; 137/392.5, 386; 159/DIG. 2, 44; 55/257.6

[56] References Cited

U.S. PATENT DOCUMENTS

| | | | |
|---|---|---|---|
| 788,905 | 5/1905 | Hill | 219/288 |
| 1,953,491 | 4/1934 | Sainte-Martire | 122/1 R |
| 2,340,468 | 2/1944 | Gunderson et al. | 137/392 |
| 2,376,694 | 5/1945 | Hewlett | 137/392 |
| 2,649,408 | 8/1953 | Williamson et al. | 202/197 |
| 3,000,212 | 9/1961 | Friel | 73/304 C |
| 3,011,956 | 12/1961 | Smith et al. | 203/20 |
| 3,074,216 | 1/1963 | Loebel | 203/10 |
| 3,104,308 | 9/1963 | Wilson | 219/285 |
| 3,135,670 | 6/1964 | Ristaino et al. | 203/7 |
| 3,219,555 | 11/1965 | Green et al. | 202/194 |
| 3,248,305 | 4/1966 | Williamson | 202/205 |
| 3,397,149 | 8/1968 | Gruber | 252/181 |
| 3,427,252 | 2/1969 | Gaughan et al. | 137/5 |
| 3,470,742 | 10/1969 | Graddock | 73/304 R |
| 3,488,474 | 1/1970 | Saunders | 219/286 |
| 3,507,754 | 4/1970 | Cristiano | 203/7 |
| 3,563,861 | 2/1971 | Fletcher | 203/20 |
| 3,864,215 | 2/1975 | Arnold | 203/11 |
| 3,944,785 | 3/1976 | Easton Williams | 219/286 |
| 3,969,193 | 7/1976 | Sakuma | 203/7 |
| 4,045,293 | 8/1977 | Cooksley | 203/10 |
| 4,080,247 | 3/1978 | Malakul | 202/181 |
| 4,540,470 | 9/1985 | Wakasugi | 203/10 |

FOREIGN PATENT DOCUMENTS

| | | | |
|---|---|---|---|
| 27725/67 | 4/1966 | Australia . | |
| 41513/64 | 9/1966 | Australia . | |
| 46069/68 | 5/1970 | Australia . | |
| 8303821 | 11/1983 | European Pat. Off. | 203/10 |
| 1242601 | 10/1986 | Japan | 203/20 |
| 734755 | 8/1955 | United Kingdom . | |
| 767927 | 2/1957 | United Kingdom . | |
| 1096154 | 12/1967 | United Kingdom | 137/392 |
| 1381113 | 1/1975 | United Kingdom . | |
| 1386255 | 3/1975 | United Kingdom | 137/392 |
| 2101578 | 1/1983 | United Kingdom . | |
| 2105467 | 3/1983 | United Kingdom | 137/386 |

*Primary Examiner*—Virginia Manoharan
*Attorney, Agent, or Firm*—Larson and Taylor

[57] ABSTRACT

An electronic control and dosing system for desalinators (10) has a baffle, disposed between the evaporation and condensation chambers, fitted with probes (70, 71) which detect the presence of liquid created by entrained bubbles, that pass through the holes in the baffle. A control circuit (72), connected to the probes (70,71), closes a solenoid valve (62) to shut off the supply of feed water to the desalinator (10) until the threat of entrainment has passed. A foaming and/or scale inhibiting polymer, contained in a tank (64), is periodically introduced to the feed water inlet line (63) by a solenoid valve (65) controlled by a timer circuit (66).

16 Claims, 2 Drawing Sheets

ELECTRONIC CONTROL AND DOSING SYSTEM FOR DESALINATORS

BACKGROUND OF THE INVENTION

1. Field of the Invention

This invention relates to electronic control dosing system for desalinators.

2. Prior Art

International Application No. PCT/AU83/00048 (International Publication No. WO83/03821) discloses a desalinator for brackish-a-salt water which has generally proved successful for the economic installation of fresh water e.g. for vessels.

That desalinator has been shown to have improved performance over known desalinators. In particular it has a more stable boil as air is not entrained in the feed water supplied to the evaporation chamber, as the feed water does not pass through the pump supplying cooling water to the condenser tubes, as is commonly found in other known desalinators.

The desalinator, however, is not totally free of entrainment caused by aeration or ebullition resulting from an unstable boil as there are many other factors which may cause the boil in the desalinator to become unstable. These factors can include rapid increases in feed water temperature (i.e. 7° C. variation in seawater within a few meters have been noted); changes in flow of feed water and/or condensing water; vessel pitching or rolling; or the presence of microorganisms, plankton, fine coral-sand, chemicals, detergents or effluent in the feed water which can cause seeding of the unstable boil.

SUMMARY OF THE PRESENT INVENTION

It is an object of the present invention to provide a monitoring system to detect bubbles and froth indicating entrainment is occurring to control the feed water level and input.

It is a preferred object of the present invention to provide a method and means for dosing the feed water with a foam inhibitor and/or a scale inhibitor.

It is another preferred object of the present invention to provide an automatic dumping device as a fail-safe system should a mechanical breakdown occur.

Other preferred objects of the present invention will become apparent from the following description.

In one aspect the present invention resides in a feed water level control system for a desalinator including:

a feed water inlet to the evaporation chamber of the desalinator;

feed water valve means operable to control the flow of feed water through the inlet in response to the feed water level in the desalinator;

a baffle above the evaporator zone to allow steam to pass to the condenser zone to be condensed;

electric probe means above the baffle; and electronic control means connected to the probes and operable to control the valve means, so arranged that when contaminated water or steam rises through the baffle and contacts the probes, the control means operates the valve means to shut off the flow of feed water to the inlet until the contamination is overcome.

In a second aspect the present invention resides in a foam and/or scale inhibitor dosing unit for a desalinator including;

a feed water inlet to the desalinator;

feed water valve means operable to control the flow of feed water through the inlet in response to the feed water level in the desalinator;

an inhibitor supply tank; and an inhibitor supply valve means controlled by a timer to allow a preset volume of inhibitor to be fed to the feed water.

Preferably the feed water valve means is a solenoid valve which is upstream of a ballcock valve with a ball that monitors the feed water level in the desalinator. Preferably the feed water is drawn from the outlet side of the condensation tubes and is fed through a strainer to the feed water inlet via the solenoid valve which is controlled by the control means to shut off the flow of feed water to the desalinator if the boiling of the water in the desalinator becomes unstable.

Preferably an entrainment mesh is provided below the condenser (in a tunnel between the evaporator and condenser zones) to prevent any water droplets coming in contact with the condenser coils if the boiling becomes unstable, the entrainment mesh only allowing droplet-free steam to enter the condenser zone.

Preferably the electronic control system controls an automatic dumping device which has two probes placed in the fresh water or distillate header tank to measure the conductivity therein, the dumping system incorporating a valve which bypasses the main storage tank if the conductivity exceeds a preset level.

BRIEF DESCRIPTION OF THE DRAWINGS

To enable the invention to be fully understood, a preferred embodiment will now be described with reference to the accompanying drawings, in which.

DETAILED DESCRIPTION OF THE PREFERRED EMBODIMENTS

Figure 1:
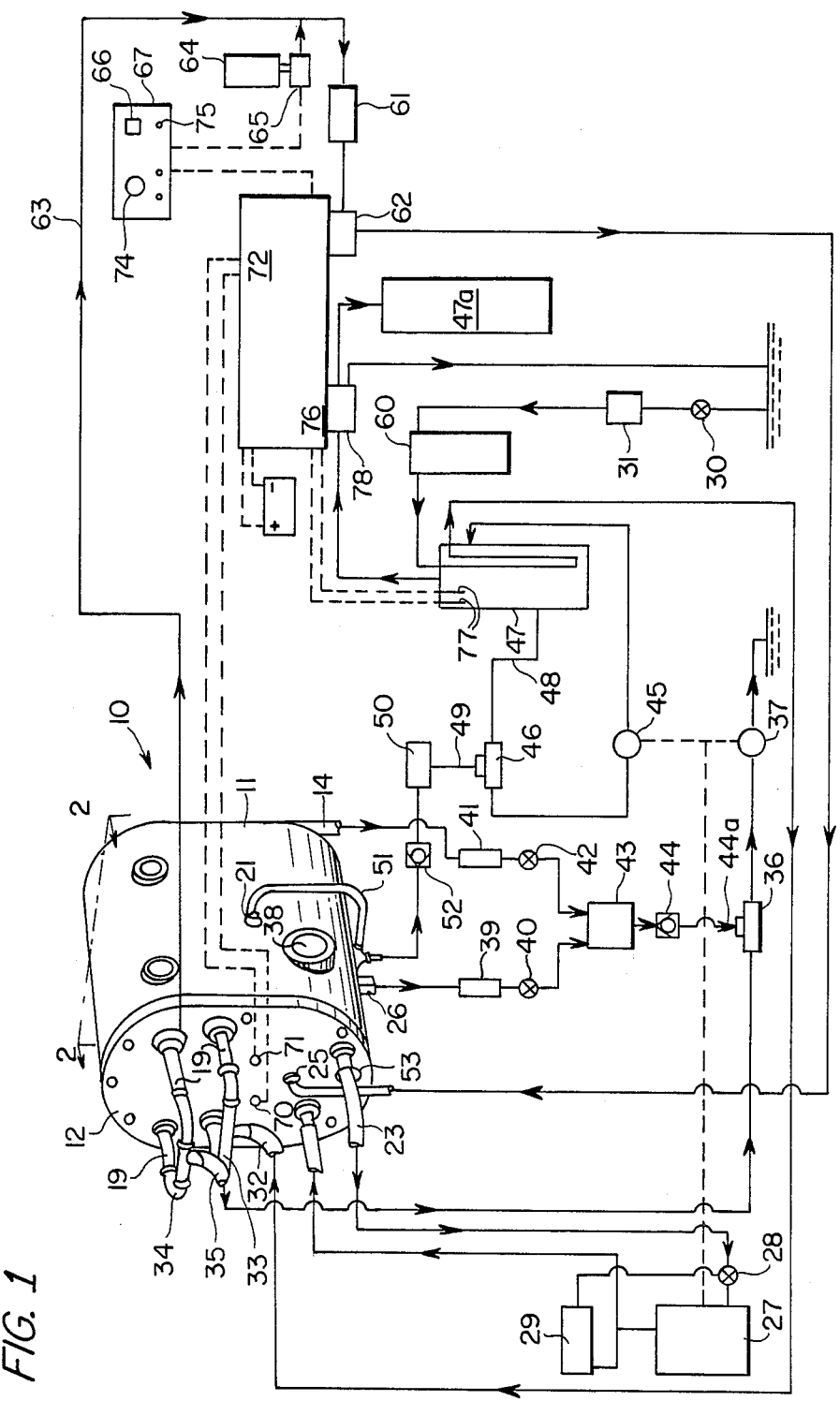
FIG. 1 is a schematic circuit diagram of the desalinator fitted with the entrainment control apparatus and the inhibitor dosing unit.

The desalinator 10 is generally of the type described in International Application No. PCT/AU83/00048 (International Publication No. WO83/03821) and common numerals are used herein.

The desalinator has a fiberglass shell 11, with removable end plates 12.

The condensation chamber 18, with condenser tubes 19, is separated from the evaporation chamber, with its heat exchange 22, by baffles 15, 16 and the mesh screen 17.

The salt water is sucked from the sea through a seacock 30 and filter 31 and passes through a raw water feed tank 60 and condensing coils (not shown) in the fresh water header tank 47 before passing through the inlet pipe 32 connected to the manifold 33 for the condensing coils.

A portion of the heated salt-or brackish water from the outlet side of the condenser coils 19 passes through a strainer 61 and solenoid valve 62 in the feed water inlet line 63, which is provided with a ballcock valve 25. The valve 25 has a ball 25a which monitors the level of the feed water 13 in the desalinator. (In our earlier desalinator, the feed water was controlled by a manual valve 25.)

A polymer (e.g. a polyalkene glycol sold under the trade mark "VaptreatH") is mixed with water e.g. in a ratio of 15 ml polymer/2 L water and is stored in a polymer tank 64. The polymer is designed to reduce the foaming of the boiling feed water and to reduce or prevent the build up of scale in the desalinator. The polymer is injected into the feed water inlet line 63 at regular intervals e.g. every two minutes by a solenoid valve 65 which connects the tank 64 to the line. A timer circuit 66 in the control unit 67 operates the solenoid valve 65 to dose the feed water with polymer A baffle 68, made of a non-conductive material, e.g., polypropylene or polyethylene, is fitted to the desalinator above the ball valve 25 and approximately 180 mm below the entrainment mesh 17. The baffle is wider than the inside of the chest 11, causing it to be upwardly curved about 6 degrees, and is located in slots above the sides of the chest in the inclined baffles 15.

The baffle 68 is provided with holes 69, e.g. of 3 mm diameter and spaced e.g. 12.5 mm apart. The holes are designed to allow no more than 2.3 inches of pressure differential between the evaporation chamber and the condensing chamber 18 at maximum vapor velocities (as checked by a water pressure gauge). Any bubbles forced through the holes by the pressure differential collapse and the liquid from the bubbles are shed down the curved baffle 68 and returned to the evaporation chamber.

Figure 3:
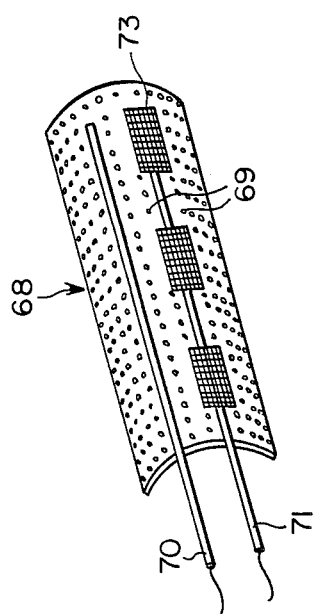
FIG. 3 is a perspective view of the baffle and the entrainment probes.
Figure 2:
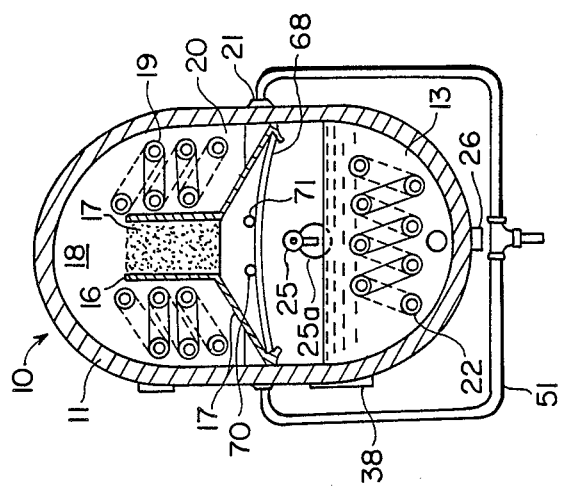
FIG. 2 is a sectional end view of the desalinator showing the entrainment baffle in position.

Referring to FIG. 3, a pair of probes 70, 71 are placed e.g. 70 mm apart on top of the baffle 68. The probes are connected to a very low DC volt comparator circuit 72 so that the probes are able to sense the presence of the smallest amount of liquid but are unaffected by the vapor.

The cathode 70 is made of 316 stainless steel rod and runs the full length of the baffle and is sealed through one of the end plates 12.

The anode 71, also a 316 stainless steel rod and sealed through the end plate 12, has three detection grids in the form of platinum plated titanium expanded mesh sensors 73 evenly spaced over its length.

The comparator sensing circuit 72 has trim adjustment 74 on the control unit 67 and is preferably set at a sensitivity level of 300 ppm or below.

When an unstable boil occurs, bubbles pass through the holes 69 in the baffle 68 and the liquid completes the circuit between the probes 70, 71. The probes 70, 71 cause the sensing circuit 72 to close the solenoid valve 63, thereby cutting off the feed water to the desalinator. The level of the salt water 13 in the evaporation chamber drops until the potential threat of entrainment ceases. During this period, however, the desalinator produces distillate at normal rates. LED lights 75 on the control unit indicate if the feed water is shut off or being dosed with polymer.

The automatic dumping system 76 has a pair of probes 77 in the fresh water header tank 47 to detect conductivity at 20° C. (The total dissolved salts are preferably below 21 mg/L at a pH of 5.75.) If the contamination level exceeds the preset level, a solenoid valve 78 is operated to bypass the fresh water storage tank 47 to dump the contaminated water. (The dumping circuit can also be connected to a dump valve (not shown) which will dump excess feed water from the desalinator, below the level of the fresh water outlet, if the desalinator becomes flooded.)

For maximum efficiency of the desalinator, a thermostatically controlled valve 28 can be provided to selectively direct the water from the evaporator back to the cooling jacket of the engine 27 or to the engine's heat exchanger 29. If the water from the engine 27 enters the evaporator coils 22 at e.g. 80° C. and leaves the coils 22 at e.g. 65° C., all the water is returned to the engine cooling jacket (i.e. in a closed loop). However, if the water leaves the coils at e.g. 69° C. when the engine 27 is under load, all or part of the water is diverted by the thermostatically controlled valve 28 to the engine's heat exchanger 29 to prevent overheating of the engine. This enables maximum heating of the desalinator without the chance of overheating the engine 27.

Tests have shown that the control system ensures that the desalinator produces distillate of a high quality, even at very high distallation rates, from brackish-a-salt water, and even from effluent. In one experiment, the desalinator produced water which couples with the WHO drinking standards for humans from effluent obtained from the secondary sedimentation tank at a sewage treatment plant.

The embodiments described are by way of illustrative example only and various changes and modifications may be made thereto without departing from the scope of the present invention as defined in the appended claims.

What is claimed is:

1. A feed water level control system for a desalinator including an evaporation chamber and a condenser zone including condenser coils, said feed water level control system including:
   a feed water inlet to the evaporation chamber of the desalinator;
   feed water valve means for controlling the flow of feed water through the inlet in response to the feed water level in the desalinator;
   a perforate baffle, having openings therein and being disposed above the evaporator chamber, for allowing steam to pass therethrough to the condenser zone to be condensed;
   electric probe means, including a plurality of spaced probes disposed above the baffle, for detecting the presence of water created by entrained bubbles which pass through the openings in the baffle; and
   electronic control means, connected to said probe means and responsive thereto, for controlling the valve means such that when the water from said entrained bubbles contacts the probes, the valve means is shut off to terminate the flow of feed water to the inlet until bubbles are no longer entrained.

2. A control system according to claim 1 wherein:
   the feed water valve means comprise a solenoid valve upstream of a ballcock valve in the desalinator, the ballcock valve having a ball which monitors the feed water level in the desalinator, the feed water being drawn from the outlet side of the condenser coils in the desalinator.

3. A control system according to claim 1 wherein:
   the probes include a cathode comprising a stainless steel rod and an anode comprising a stainless steel rod provided with a plurality of spaced platinum plated titanium expanded mesh sensors.

4. A control system for desalinators including the feed water control system according to claim 1 and further including:
   a foam and scale inhibiting dosing unit including:
   an inhibitor supply tank;

an inhibitor supply valve means for controlling the flow of inhibitor from the supply tank to the feed water; and timer means for controlling said inhibitor supply valve means so as to permit a preset volume of inhibitor to be fed from the supply tank to the feed tank water.

5. A control system according to claim 4 wherein the desalinator includes a distillate storage tank, said system further including:

an automatic dumping system including:
- a pair of probes disposed in the distillate storage tank;
- a sensing circuit connected to the probes for monitoring the conductivity of the distillate in the storage tank; and
- solenoid valve means, responsive to the sensing circuit, for dumping distillate from the storage tank when the conductivity exceeds a preset level.

6. A control system according to claim 1 wherein said perforate baffle comprises a non-conductive curved baffle member having a plurality of openings therein of a size such that bubbles produced by ebullition of the feed water in the evaporator chamber are broken up when the bubbles pass through the openings.

7. A control system according to claim 6 wherein at least one of the probes of the probe means comprises at least one detection grid mounted on said baffle member.

8. A foam and scale inhibitor dosing unit for a desalinator including:

a feed water inlet to the desalinator;

feed water valve means for controlling the flow of feed water through the inlet in response to the feed water level in the desalinator;

an inhibitor supply tank;

an inhibitor supply valve means for controlling the flow of inhibitor from the supply tank to the feed water; and timer means for controlling said inhibitor supply valve means so as to permit a preset volume of inhibitor to be fed from the supply tank to the feed water.

9. A dosing unit according to claim 8 wherein:
the inhibitor is a polyalkene glycol.

10. A desalinator comprising an evaporation chamber, a condenser zone including condenser coils, and a feed water level control system, said feed water level control system including:

a feed water inlet to the evaporation chamber of the desalinator;

feed water valve means for controlling the flow of feed water through the inlet in response to the feed water level in the desalinator;

a perforate baffle, having openings therein and being disposed above the evaporator chamber for allowing steam to pass therethrough to the condenser zone to be condensed;

electric probe means, including a plurality of spaced probes disposed above the baffle, for detecting the presence of water created by entrained bubbles which pass through the openings in the baffle; and electronic control means, connected to said probe means and responsive thereto, for controlling the valve means such that when the water from said entrained bubbles contacts the probes, the valve means is shut off to terminate the flow of feed water to the inlet until bubbles are no longer entrained.

11. A control system according to claim 10 wherein said perforate baffle comprises a non-conductive curved baffle member having a plurality of openings therein of a size such that bubbles produced by ebullition of the feed water in the evaporator chamber are broken up when the bubbles pass through the openings.

12. A control system according to claim 11 wherein at least one of the probes of the probe means comprises at least one detection grid mounted on said baffle member.

13. A control system according to claim 10 wherein:
the feed water valve means comprise a solenoid valve upstream of a ballcock valve in the desalinator, the ballcock valve having a ball which monitors the feed water level in the desalinator, the feed water being drawn from the outlet side of the condenser coils in the desalinator.

14. A control system according to claim 10 wherein:
the probes include a cathode comprising a stainless steel rod and an anode comprising a stainless steel rod provided with a plurality of spaced platinum plated titanium expanded mesh sensors.

15. A control system for desalinators including the feed water control system according to claim 10 and further including:

a foam and scale inhibiting dosing unit including:
an inhibitor supply tank;
an inhibitor supply valve means for controlling the flow of inhibitor from the supply tank to the feed water; and
timer means for controlling said inhibitor supply valve means so as to permit a preset volume of inhibitor to be fed from the supply tank to the feed water.

16. A control system according to claim 15 wherein the desalinator includes a distillate storage tank, said system further including:

an automatic dumping system including:
- a pair of probes disposed in the distillate storage tank;
- a sensing circuit connected to the pair of probes for monitoring the conductivity of the distillate in the storage tank; and
- solenoid valve means, responsive to the sensing circuit, for dumping distillate from the storage tank when the conductivity exceeds a preset level.

* * * * *